United States Patent [19]
Hazzard

[11] 4,156,132
[45] May 22, 1979

[54] AUTOMATIC FAULT INJECTION APPARATUS AND METHOD

[75] Inventor: Michael J. Hazzard, Exton, Pa.

[73] Assignee: Burroughs Corporation, Detroit, Mich.

[21] Appl. No.: 847,481

[22] Filed: Nov. 1, 1977

[51] Int. Cl.² .................. G06F 11/00; G01R 15/12
[52] U.S. Cl. ............................. 235/302; 235/304; 324/73 R
[58] Field of Search ............ 235/302, 302.1, 302.4, 235/304, 304.1; 324/73 R, 73 AT

[56] References Cited
U.S. PATENT DOCUMENTS

| | | | |
|---|---|---|---|
| 3,710,350 | 1/1973 | Yoshitake et al. | 235/304 X |
| 3,739,349 | 6/1973 | Burdette, Jr. et al. | 324/73 R X |
| 3,849,726 | 11/1974 | Justice | 324/73 R |
| 3,916,306 | 10/1975 | Patti | 235/302 X |
| 3,927,371 | 12/1975 | Pomeranz et al. | 235/302 X |
| 4,044,244 | 8/1977 | Foreman et al. | 235/304 X |

*Primary Examiner*—Jerry Smith
*Attorney, Agent, or Firm*—Mark T. Starr; Edmund M. Chung; Kevin R. Peterson

[57] ABSTRACT

An apparatus for simulating error conditions associated with an integrated circuit, the integrated circuit being an in-line component of an electronic circuit. The apparatus, in response to the receipt of specified commands, accepts and stores data and control information, the control information including an integrated circuit pin specification portion and a voltage level specification portion, the data information specifying integrated circuit pin number identification. Two decoders decode the voltage level specification and integrated circuit pin specification portions of the stored control information, respectively. A switching circuit connected to a source of voltage levels and to the electronic circuit, and responsive to the decoded integrated circuit pin specification, applies to the integrated circuit pin specified by the stored data information a voltage level specified by the decoded voltage level specification. The voltage level is applied as a non-in-line input signal to the integrated circuit pin or a non-in-line output signal from the integrated circuit pin in accordance with the decoded integrated circuit pin specification. Provision is made for employing a data processor to programmatically control the simulation of errors. A process for using the apparatus to develop and evaluate diagnostic programs is disclosed.

29 Claims, 8 Drawing Figures

| | MSB | | | | | | | | | | | | | | | LSB |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| CONTROL WORD | SOURCE | GND | SW1 | SW2 | SW3 | SW4 | SW5 | SW6 | SW7 | SW8 | SW9 | SW10 | SW11 | SW12 | SW13 | SW14 |
| DATA WORD | PIN 1 | PIN 2 | PIN 3 | PIN 4 | PIN 5 | PIN 6 | PIN 7 | PIN 8 | PIN 9 | PIN 10 | PIN 11 | PIN 12 | PIN 13 | PIN 14 | PIN 15 | PIN 16 |
Fig.4
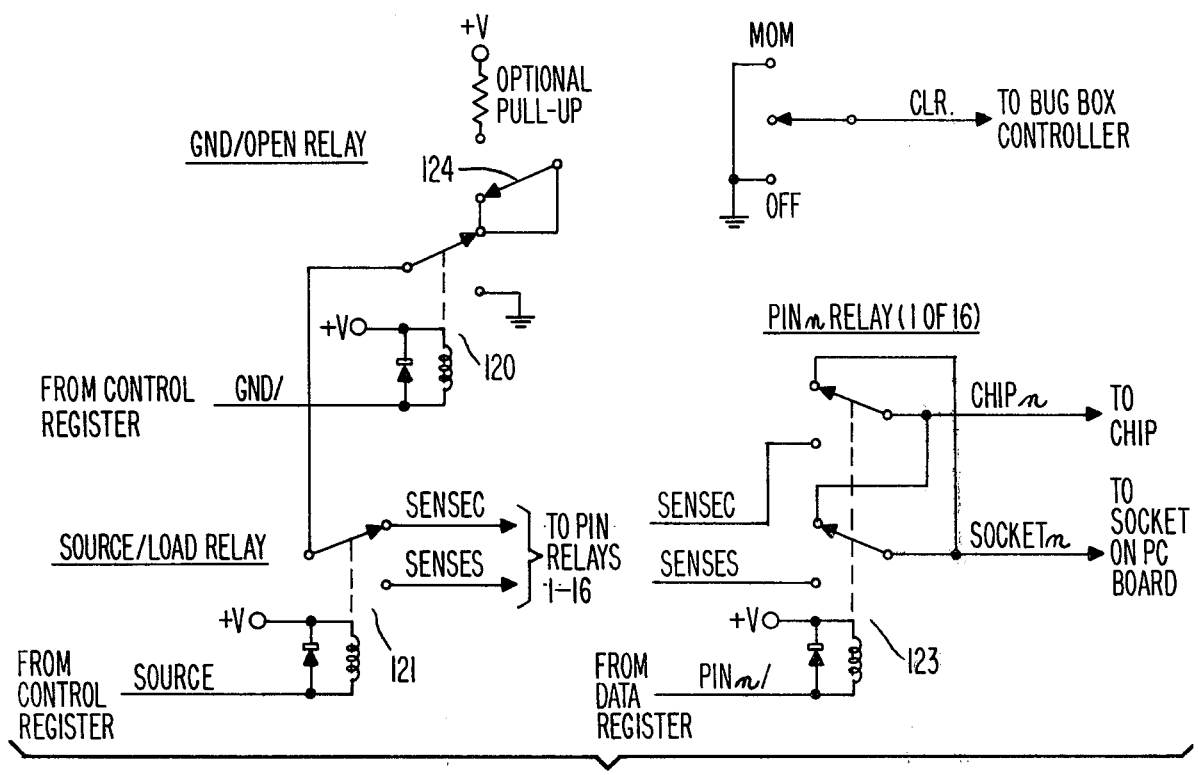
Fig.5
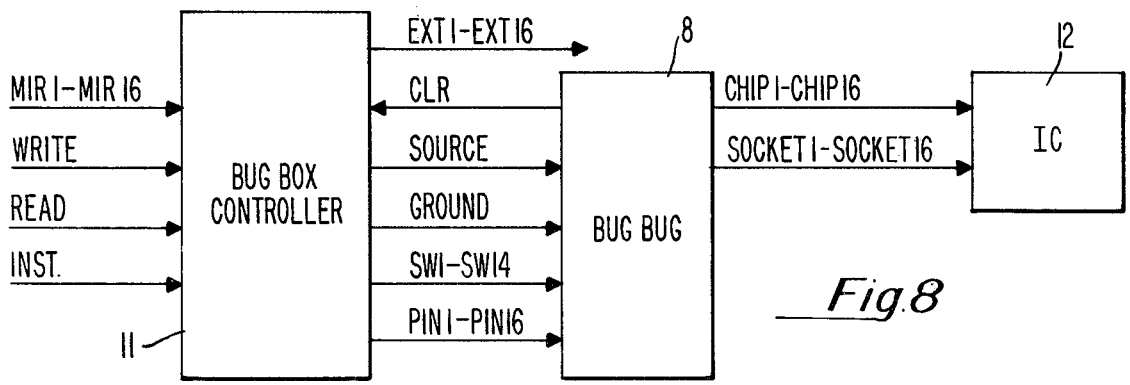
Fig.8

AUTOMATIC FAULT INJECTION APPARATUS AND METHOD

BACKGROUND OF THE INVENTION

The present invention relates in general to an apparatus and method for injecting faults on the pins of an integrated circuit employed to perform a logical function.

In the testing of the error detection section of a device employing integrated circuits, it is desirable to be able to create error conditions on the inputs and outputs of the integrated circuits employed in the device. The ability to create such error conditions is also useful in the development and testing of diagnostic programs used in data processing systems to diagnose faults in the data processor and attached input/output devices.

Testing apparatuses for dynamically injecting errors in a data processing system have previously been proposed, for example, in East, D. G., et al., Error Injector for Testing a Data Processing Unit, in IBM Tech. Disc. Bull., 17 (6): p. 1691, Nov. 1974, and also in Maiden, D. W., et al., Error Injector Probe, in IBM Tech. Disc. Bull., 18 (1): p. 7, June 1975. In such apparatuses, it will be realized that an error may only be injected at one point in a device once the testing apparatus is connected. Further, the occurrence and location of an error cannot be controlled programatically.

Computer controlled circuit testers for applying predetermined signals to individual pins to which the circuit to be tested is connected have also been proposed, for example, in U.S. Pat. No. 3,872,441 by George William Cailow, filed Nov. 29, 1972. In such an apparatus, it will be realized that errors cannot be applied to circuits that are performing a logical function in the device of which they are an element.

Testing units for insertion in a circuit with a circuit board, including an extender board containing circuits for transmitting and receiving data, have been proposed, for example, in U.S. Pat. No. 3,904,861 by John E. McNamara, filed Mar. 13, 1974. In such an apparatus, the circuit board is removed and the extender board is placed in circuit with the circuit board. The circuit board may then be tested with a duplication of system conditions, the circuits in the extender board receiving and transmitting data. In such an apparatus, it will be realized that the functions performed by the circuits on the extender board are fixed by the hardware and therefore signals cannot be selectively altered or passed through without modification. Further, the apparatus is designed to operate only on signals entering and leaving the circuit board through the circuit board's connection with the connector block the circuit board normally plugs into. As a consequence, no modification to signals passing between circuits mounted on the circuit board can be performed.

Therefore, it is an object of the present invention to provide an error injection apparatus which can simulate error conditions in an integrated circuit which is an in-line component of an electronic circuit.

Another object of the present invention is to provide an error injection apparatus capable of simulating errors on multiple input or output pins of an integrated circuit.

It is a further object of the present invention to provide an error injection apparatus capable of varying the input or output pins of an in-line integrated circuit which have simulated errors applied to them without the necessity of rewiring the error injection apparatus.

It is an additional object of the present invention to provide a programmatically controlled apparatus and method for simulating errors on input or output pins of an integrated circuit while the integrated circuit is performing its normal logical functions as an in-line component of an electronic circuit.

SUMMARY OF THE INVENTION

The present invention alleviates these and other limitations of the prior art by providing an apparatus for semiautomatically simulating an in-line error on any pin of an integrated circuit coupled to an electronic circuit via an integrated circuit socket.

In accordance with this invention, the integrated circuit is removed from its normal socket position and mounted in a socket attached to a bug box circuit board. A connector plugs into the position originally holding the integrated circuit and a cable couples said connector with a connector on the bug box. The bug box is supplied with power from the pins which ordinarily supply power to the integrated circuit. In addition, the bug box thereby has access to the signal lines normally connected to the integrated circuit.

The bug box contains switching circuitry which can implement physical connections between selected positions of the socket holding the integrated circuit and corresponding positions on the connector coupled to the original position of the integrated circuit. The switching circuitry is also capable of connecting a voltage level to specified positions on the integrated circuit socket mounted on the bug box or to specified positions on the bug box connector coupled to the original position of the integrated circuit.

The switching circuitry on the bug box is controlled by logic mounted on a bug box controller board. A cable couples the bug box controller to the bug box. The bug box controller contains two 16-bit registers, a data register and a control register, which can be loaded from an external source under control of commands received from an external source. The registers are used to store information specifying which integrated circuit pin (or pins) is to have a simulated error applied to it, what voltage level is to be applied as the error and whether said pin (or pins) are input or output pin(s) of the integrated circuit. The outputs of the registers are fed as input signals to the bug box via the cable coupling the bug box controller to the bug box. The bug box uses the input signals as inputs to decoder and switching circuitry which applies the error specified by the input signals.

Inputs to the bug box controller are over an interface consisting of 16 data positions and a control line specifying which register the data is to be loaded into. A second interface provides data and control lines for reading out the contents of the two registers.

In operation, data fields specifying the error to be injected are written into and stored in the registers of the bug box controller. The bug box controller provides control signals to the bug box corresponding to the contents of the registers. The bug box varies the error conditions applied to the integrated circuit by decoding the control signals received from the bug box controller and applying a simulated error in accordance with the decoded control signals.

A data processing system may be coupled to the bug box controller in order to achieve programmable error simulation. In such case, a central processing unit (CPU) prepares the information to be sent to the bug box controller, and transmits the information to an input/output controller which prepares the information for transmission to the bug box controller. The input/output controller may be integrated in the CPU. The input/output controller is coupled to the bug box controller by bidirectional interfaces which transfer data patterns and control signals.

With the bug box controller coupled to a CPU via an input/output controller, the present invention may be used to evaluate the effectiveness of diagnostics designed to test input/output devices attached to other input/output controllers of the CPU. Such a process consists of programmatically simulating an error on a pin of an integrated circuit employed in the logic of an input/output unit attached to the CPU, then processing a diagnostic program to exercise the functions of said input/output unit, and then outputting the failure data from the diagnostic program and a description of the error on an output device attached to the CPU. A different error is then programmatically simulated and the process is repeated.

The invention is pointed out with particularity in the appended claims. A more thorough understanding of the above and further objects and advantages of this invention may be attained by referring to the following description taken in conjunction with the accompanying drawings.

BRIEF DESCRIPTION OF THE DRAWINGS

FIG. 4 is a schematic view of the data and control fields which are stored in the data and control registers of FIG. 2;

FIG. 5 is a schematic diagram showing the operation of the bug box of FIG. 1;

FIG. 8 shows in diagrammatic form the interface into the bug box controller, the interface between the bug box controller and the bug box, and the interface between the bug box and the integrated circuit.

DESCRIPTION OF THE PREFERRED EMBODIMENT

Figure 1:
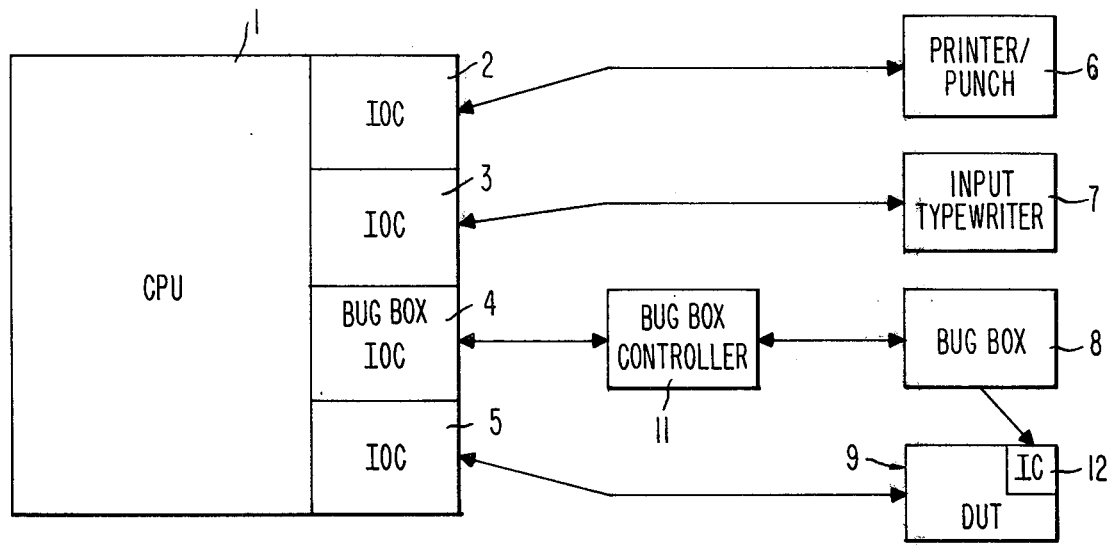
FIG. 1 shows in diagrammatic form the programmable system of the present invention for injecting errors on an integrated circuit.

Referring now to FIG. 1, a central processing unit (CPU) 1 for processing data and transmitting or receiving data signals is shown. The CPU 1 may communicate with input/output control sections (IOCS) 2,3,4,5 which handle data transfer between the CPU 1 and input/output peripheral devices 6,7,9, 11. Although shown as integrated with the CPU 1, the IOCs 2,3,4,5 may be separate from the CPU 1. Equivalent data processors may replace the CPU 1 and IOCs 2,3,4,5.

Each IOC 2, 3, 4, 5 may handle communications between the CPU 1 and one I/O device, such as a printer/punch 6, input typewriter 7, or other I/O device. In the preferred embodiment, the CPU-IOC combination is a Burroughs Corporation B700 series data processing system. However, many other data processing systems may be used in place of the B700.

The interface coupling each IOC 2,3,4, 5 and its attached I/O device, 6, 7, 9, 11, respectively may transfer data and control signals bidirectionally in response to commands initiated by the CPU 1. The CPU 1 may issue a data word or control word write command to IOC 4 and transfer 16-bits of data to the IOC 4. In response to receiving the command and data, the IOC 4 will place the 16-bits of data received on the interface between the IOC 4 and Bug Box Controller 11 and activate the WRITE signal line on the interface. If the command issued by the CPU 1 is a control word write, the IOC 4 will also activate the INST signal line on the interface. The INST signal line will not be activated if the command is a data word write.

The CPU 1 may issue a data word or control word read command to IOC 4. In response to receiving a read command, the IOC 4 will activate the READ signal on the interface between the IOC 4 and Bug Box Controller 11 and will accept 16-bits of data from the interface. If the command issued by the CPU 1 is a control word read, the IOC 4 will also activate the INST signal line on the interface. The INST signal line will not be activated if the command is a data word read.

In the preferred embodiment, IOC 2, IOC 3, and IOC 5 are logical equivalents of IOC 4 and function identically as IOC 4. The input typewriter 7 and printer/punch 6 are standard devices used for input and output of data in a data processing system. The Device Under Test (DUT) 9 may be any input/output device whose circuitry employs at least one integrated circuit (IC) 12, said integrated circuit 12 having a multiple pin connector which plugs into an integrated circuit socket in the DUT 9. As the following discussion will explain, it is this integrated circuit 12 onto which an error may be injected.

Figure 2:
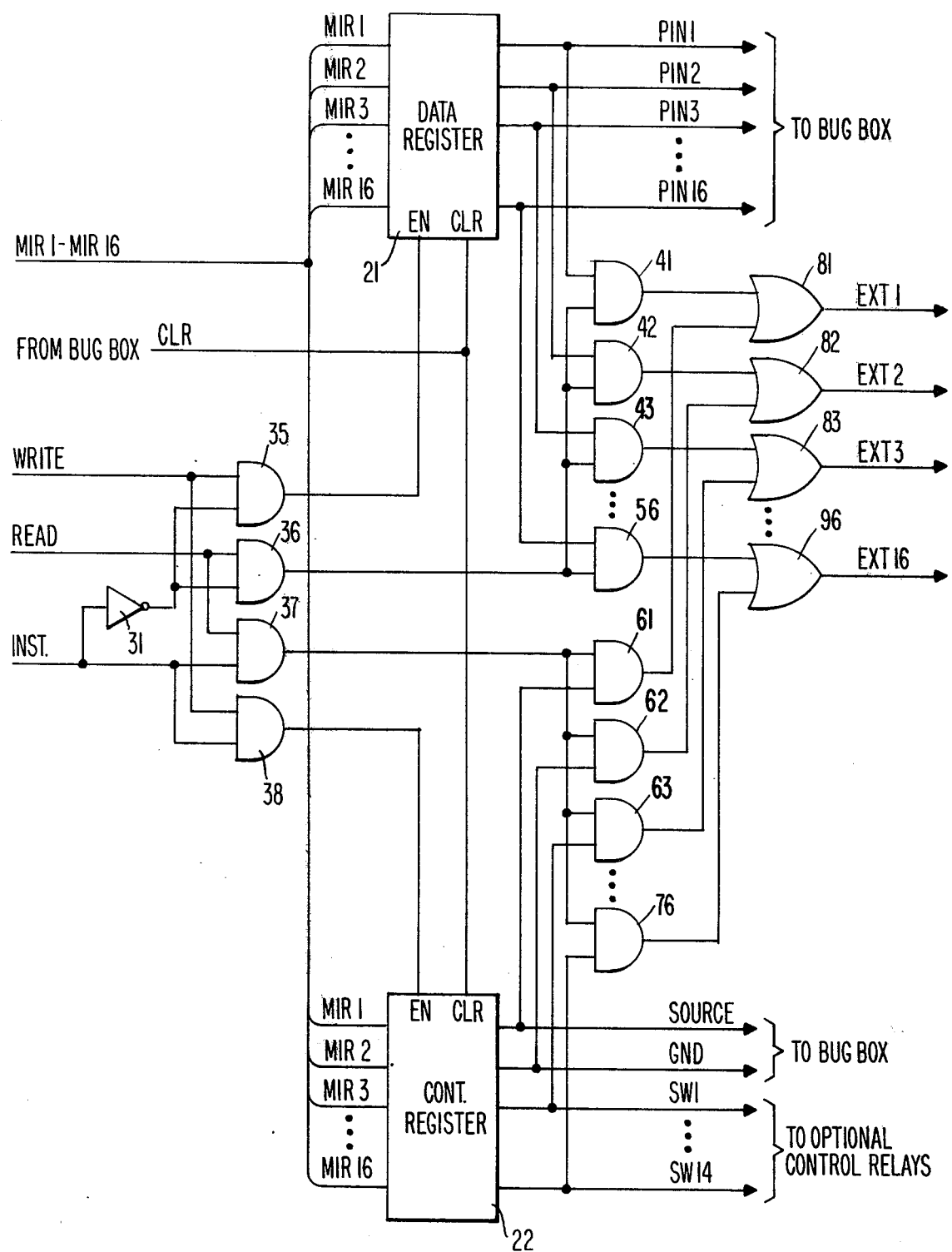
FIG. 2 is a schematic diagram showing the operation of the bug box controller of FIG. 1.

The Bug Box Controller 11 is the communications interface between the Bug Box IOC 4 and the Bug Box 8. Its function is to store and distribute the data used to specify the error to be injected on the integrated circuit 12. The Bug Box Controller 11 logic is illustrated in FIG. 2. Basically, the Bug Box Controller 11 contains two 16-bit registers, a Data Register 21 and a Control Register 22, which receive their inputs from the Bug Box IOC 4 as the result of write commands initiated by the CPU 1. The Data Register 21 and Control Register 22 are used to store the data specifying which pin(s) on the IC 12 is to be bugged and whether the bugged pin is to be set to a ground or floating logic level. Here and henceforth, a "bug" is defined as a voltage level which is forced on an input to an IC 12 or an output from an IC 12. Outputs from the registers 21, 22 are used as logic inputs to the Bug Box 8.

In the preferred embodiment, the type of bug to be applied is specified by the contents of the contents of the Data Register 21 and the Control Register 22. These registers 21, 22 are loaded via write commands issued by the CPU 1. FIG. 4 illustrates the format of data used to specify the bug. The Control Word specifies whether the bug is to be a ground (bit 2 on) or a floating level (bit 2 off) and whether an IC 12 input pin (source bit on) or an IC 12 output pin (source bit off) is to be bugged. Bit positions 3-16 of the Control Word are not used in specifying the bug, nor must they be used in the present invention.

The Data Word is used to specify which pin(s) of the IC 12 are to be bugged, a bug being applied to each IC 12 pin with its corresponding bit in the data word on.

The CPU 1 issues a command to the Bug Box IOC 4 specifying a read or write of the control word or data word. In a write operation, the Bug Box IOC 4 transfers the data received from the CPU 1 to the Bug Box Controller 11, along with a signal specifying whether it is data or control information. In the case of a read operation, the Bug Box IOC 4 signals the Bug Box Controller 11 as to whether it wants data or control information and accepts data supplied by the Bug Box Controller 11.

Referring to FIG. 2, let us assume that the CPU 1 issues a Data Word Write command to the Bug Box IOC 4. The Bug Box IOC 4 will activate the Write line and place the data word on the interface between the IOC 4 and the Bug Box Controller 11. The data will be received by the Bug Box Controller 11 on data lines MIR1–MIR16. The INST line is used to specify a Control Word operation and hence it will not be active. The Write line being active will activate one input to AND gates 35 and 38. Since the INST line is not active, the output of Inverter 31 will be active; thus both inputs to AND gate 35 will be active. The resulting active output of AND gate 35 enables Data Register 21 to accept data and Data Register 21 will be loaded with the data word on lines MIR1–MIR16. In the case of a control word write, since the INST line will be active, the control word will be loaded into the Control Register 22.

In order for the CPU 1 to read the contents of the Data Register 21 or Control Register 22, the CPU 1 issues either a Data Word Read Command to IOC 4 or a Control Word Read Command to IOC 4, respectively. In the case of a control word read, the IOC 4 will activate the READ line and the INST line to the Bug Box Controller 11. The READ signal will activate one leg of two legged AND circuit 37 and the INST signal will activate the other input to AND circuit 37, thus causing the output of AND circuit 37 to be active and supply one active input to each of AND circuits 61–76. The other inputs to two legged AND circuits 61–76 are the outputs of Control Register 22, thus resulting in the contents of Control Register 22 being gated as inputs to OR circuits 81–96. The EXT1–EXT16 outputs of OR circuits 81–96 thus represent the contents of Control Register 22. These EXT 1–16 outputs are connected to the bidirectional data interface between IOC 4 and Bug Box Controller 11. Hence, when a Control Word READ command is initiated by the CPU 1, the contents of the Control Register 22 are read to the CPU 1 via IOC 4 from the EXT1–EXT16 lines of Bug Box Controller 11.

The outputs of the Data Register 21 are fed as inputs to the Bug Box 8 via signal lines PIN 1–PIN 16. Similarly, the outputs of the Control Register 22 are fed as inputs to the Bug Box 8 via signal lines SOURCE, GND, and SW1–SW14.

Figure 3:
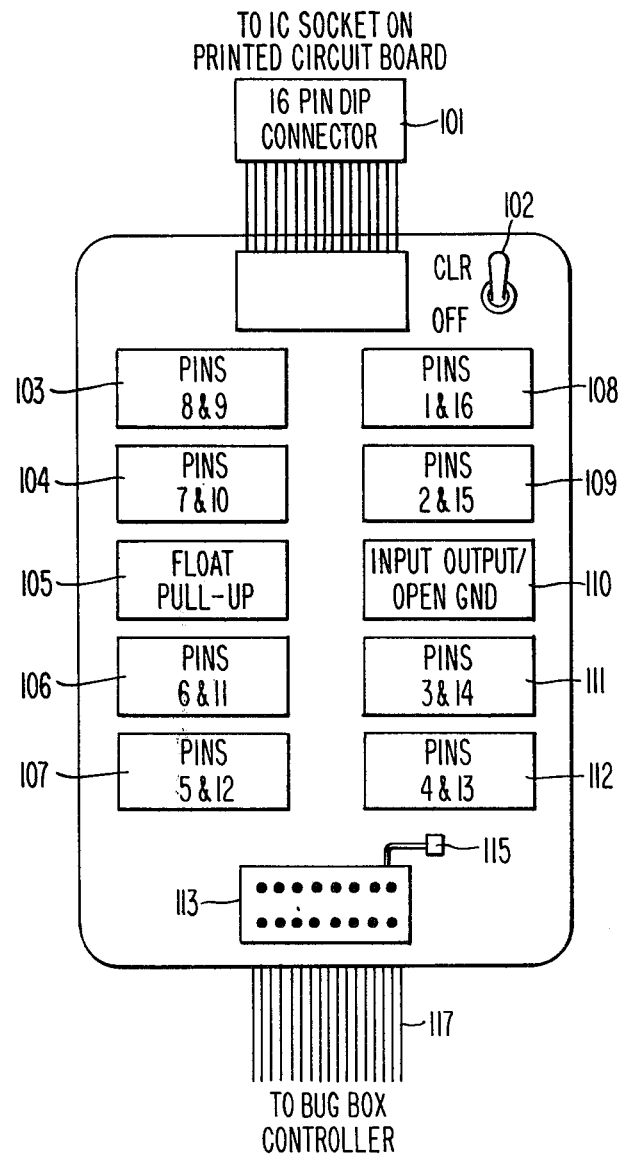
FIG. 3 is a plan pictorial diagram of a bug box such as is shown in FIG. 1.

FIG. 3 illustrates the physical appearance of the Bug Box 8. In operation, the Integrated Circuit 12 to be bugged is removed from the integrated circuit socket it normally plugs into. In its place, 16 pin DIP connector 101 is plugged into the integrated circuit socket. The Integrated Circuit 12 removed is plugged into IC socket 113 and locked in place by locking lever 115. The Bug Box 8 is connected to Bug Box Controller 11 via cable 117. DIP Relays 103–112 control the application of the bug to the integrated circuit 12. The DIP relays 103–112 may be any type of 16 pin DIP type electromechanical relay designed to be IC controlled. In the preferred embodiment, AMP relays which contain two completely independent relays, each functioning as a double pole, double throw switch, are utilized.

In the preferred embodiment, the Bug Box 8 also contains a switch 102 for manually clearing the contents of Data Register 21 and Control Register 22. The output of the switch 102 activates the CLR line (FIG. 2) which activates the CLR inputs to Data Register 21 and Control Register 22.

FIG. 5 illustrates the logical operation of the Bug Box 8. The Bug Box 8 applies the bug specified by the contents of the Data Register 21 and Control Register 22 to the Integrated Circuit 12.

The operation of the Bug Box 8 circuitry is best explained by means of an example. Assume that the bug desired is a ground voltage level applied to pin 6 of the Integrated Circuit 12 being bugged, and that pin 6 of the IC 12 is an output pin. Referring to FIG. 4, the control word required to specify this bug has the SOURCE bit on to indicate the IC 12 pin to be bugged is an output pin and the GND bit on to indicate that the IC 12 pin to be bugged is to be set to a ground voltage level. Thus the control word required has a hexadecimal representation of C000. The data word required to specify a bug on pin 6 has the pin 6 bit on and hence has a hexadecimal representation of 0400. The CPU 1 issues a Control Word Write Command to the Bug Box IOC 4, specifying a control word of C000. The Bug Box IOC 4 accepts the command and in response raises the WRITE and INST control lines and places a hexadecimal C000 on the interface to the Bug Box Controller 11. AND gate 38 (FIG. 2) is activated by the active WRITE and INST signals, activating the enter (EN) line to Control Register 22. The hexadecimal C000 data pattern on MIR1–MIR16 is hence read into Control Register 22. The CPU 1 then issues a Data Word Write command to the Bug Box IOC 4, specifying a data word of hexadecimal 0400. The Bug Box IOC 4 accepts the command and in response raises the WRITE control line and places a hexadecimal 0400 data pattern on the interface to the Bug Box Controller 11. AND gate 35 is activated by the active WRITE signal and the active output of Inverter 31, thus activating the Enter (EN) signal to Data Register 21. The 0400 data pattern on MIR-1–MIR16 is hence read into Data Register 21. The Data Register 21 and Control Register 22 hold the data entered in them and provide output lines representing the data patterns stored in them. Thus, the PIN 6 output of Data Register 21 is active, and the SOURCE and GND outputs of Control Register 22 are active. These outputs from the Data Register 21 and the Control Register 22 are inputs to the Bug Box 8. Referring to FIG. 5, which illustrates the logical operation of the Bug Box 8, the active GND input to the Bug Box 8 causes GND/OPEN relay 120 to pick, thus providing a ground voltage level as the bug voltage level. The active SOURCE input to the Bug Box 8 causes SOURCE/LOAD relay 121 to pick, thus transferring the ground voltage level from the GND/OPEN relay 120 to the SENSES output line of SOURCE/LOAD relay 121. The ground level SENSES line is inputted to each of the 16 pin relays, only one (123) of which is shown in FIG. 5. The PIN 6 line from Data Register 21 is active, causing the PIN 6 relay to pick, causing the ground voltage level on the SENSES line to be applied to the SOCKET 6 output of PIN 6 relay 123. The SOCKET 6 output line is connected to the PIN 6 position on Plug 101 and thus a ground voltage level is applied as the output of Integrated Circuit 12 pin 6.

In the example above, a bug is only created on PIN 6 of the Integrated Circuit 12. The operation of the Bug Box 8 with respect to a pin which is not to be bugged, for example pin 9, is as follows. The PIN 9 input from the Data Register 21 to PIN 9 relay 123 is not active. Hence, PIN 9 relay 123 does not pick and the CHIP 9 output of the PIN 9 relay 123 is tied to the SOCKET 9 output of the PIN 9 relay 123. The CHIP 9 output is connected to the PIN 9 position of IC socket 113. The SOCKET 9 output is connected to the PIN 9 position of connector 101. Therefore, the PIN 9 position of the Integrated Circuit 12 is wired as it would be if the bug box was not inserted; viz, as if the Integrated Circuit 12 was plugged into its normal socket position on the PC board in the DUT 9.

As another example of the operation of the Bug Box 8 circuitry, assume that it is desired to float IC 12 pins 3 and 8 of the IC 12 and that both of said pins are input pins. A control word with hexadecimal contents of 0000 and a data word with hexadecimal contents of 2100 are written into the Control Register 22 and Data Register 21, respectively. At the Bug Box 8, the GND input is not active, so GND/OPEN relay 120 does not pick, thus providing a floating voltage level as the bug voltage level. The SOURCE input to SOURCE/LOAD relay 121 is inactive, so that SOURCE/LOAD relay 121 does not pick and the floating voltage level from GND/OPEN relay 120 is applied to the SENSEC line. The PIN 3 input to PIN 3 relay 123 and the PIN 8 input to PIN 8 relay 123 are both active, causing the PIN 3 relay 123 and the PIN 8 relay 123 to pick. The floating voltage level on the SENSEC line is thus applied to the CHIP 3 and CHIP 8 lines, thus creating a floating voltage level input to pins 3 and 8 of the Integrated Circuit 12 being bugged.

The optional pull-up position of switch 124 provides a positive voltage level error instead of a floating voltage level. However, it should be obvious to one skilled in the art that the application of a positive voltage level error, instead of a floating voltage level error, could be achieved under program control by using one of the spare SW positions in the control word to activate one of the optional control relays in the Bug Box 8, and by further using the output of said optional control relay as a switch in place of present switch 124.

The present invention may be used as a system for providing failure data to be used in the development of diagnostic programs to test the functioning of input/output peripheral devices attached to a data processor. In a typical data processing system, the CPU processes the diagnostic program, which is made up of program routines to exercise an attached input/output device. Actual results are compared with expected results and if they agree, the input/output device is functioning correctly. If the actual and expected results do not agree, the diagnostic program evaluates the actual data and isolates on the failure. In a more sophisticated diagnostic program, this evaluation will pinpoint the failing components so that it may be replaced by field engineering personnel.

In order to develop diagnostic programs capable of evaluating failures in input/output devices, failures in the input/output device logic must either be simulated or created by some hardware mechanism. The present invention provides a method of speeding up the process of obtaining failure data.

Figure 6:
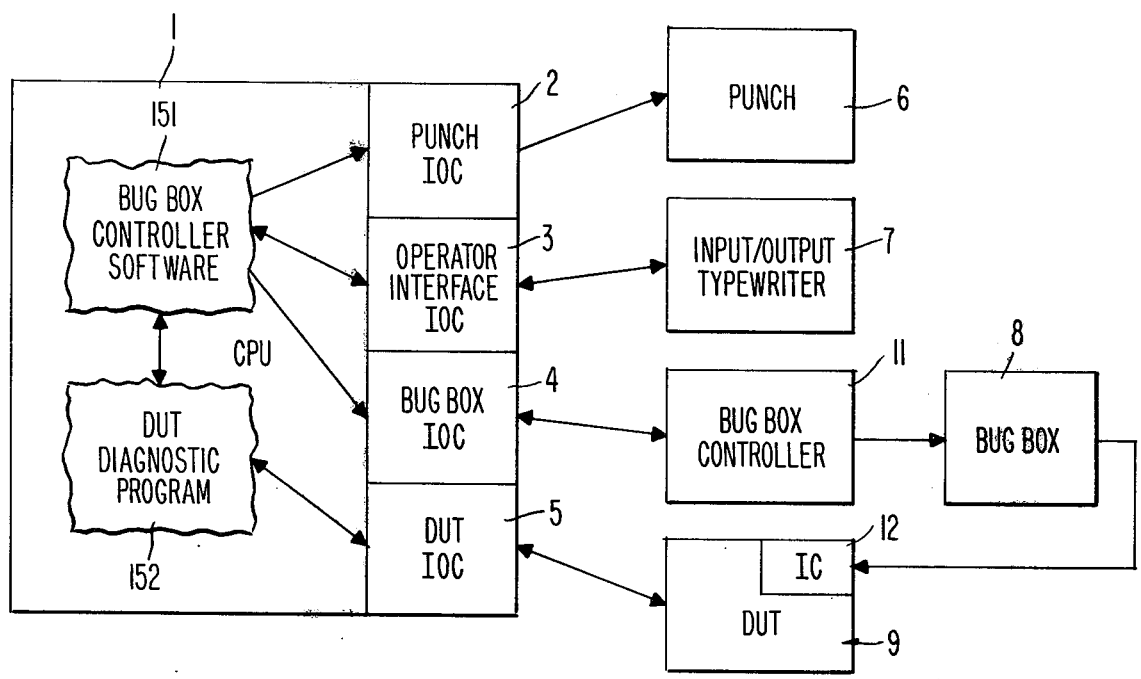
FIG. 6 shows in diagrammatic form the environment for programmatically injecting errors on pins of an integrated circuit which is a logical component of an input/output device.

FIG. 6 illustrates how the present invention is used to develop failure data. An Integrated Circuit 12 is removed from the device under test (DUT) 9 and is connected to the Bug Box 8. The CPU 1 at this time is under the control of the Bug Box Controller Software. (BBCS) 151. The operator uses the input/output typewriter 7 to input data to the Bug Box Controller software 151, specifying the location of the Integrated Circuit 12 hooked to the Bug Box 8, which pins of the Integrated Circuit 12 are input pins and which pins of the Integrated Circuit 12 are output pins.

The Bug Box Controller Software 151 uses the operator inputted data to set up a data and control word specifying a bug on one pin of the Integrated Circuit 12. The BBCS 151 then issues Write commands to the Bug Box IOC 4 to create said bug on the Integrated Circuit 12 hooked to the Bug Box 8. The BBCS 151 then branches to the Device Under Test (DUT) Diagnostic Program 152.

The DUT Diagnostic Program 152 is designed to test the logical functions of the input/output device under test (DUT) 9. The DUT Diagnostic Program 152 is executed and failure data, if any, if saved by the DUT Diagnostic Program 152 in a specified storage area within the DUT Diagnostic Program 152. The DUT Diagnostic Program 152 then branches back to the BBCS 151. The BBCS 151 then outputs on the Card Punch 6 the location and type of failure injected, and the failure data, stored by the DUT Diagnostic Program 152, corresponding to the bug injected.

The BBCS 151 then modifies the data specifying the bug so that the bug will be injected on a different pin of the IC 12, executes the routine to implement the bug on the Integrated Circuit 12, and branches to the DUT Diagnostic Program 152, which again exercises the DUT 9, and stores the failure data. Control is then passed to BBCS 151 which outputs a description of the bug and the failure data on the Punch 6. The BBCS 151 then proceeds to bug still another pin of the Integrated Circuit 12.

When all pins of the Integrated Circuit 12 have been bugged, the BBCS 151 outputs a message to the operator on the input/output typewriter 7 informing the operator that tests on the IC 12 have been completed. The operator will then restore the Integrated Circuit 12 to its original socket location in the DUT 9, remove another integrated circuit from the DUT 9, mount said IC 12 in the Bug Box 8, and the process is repeated for this new integrated circuit.

The results outputted on Card Punch 6 can be used by the diagnostic programmer to develop a fault dictionary which lists the failing integrated circuit or circuits associated with failure data obtained as a result of running the DUT Diagnostic Program 152. Such a dictionary is most useful to field engineering personnel when trouble-shooting failures in an input/output device.

Figure 7:
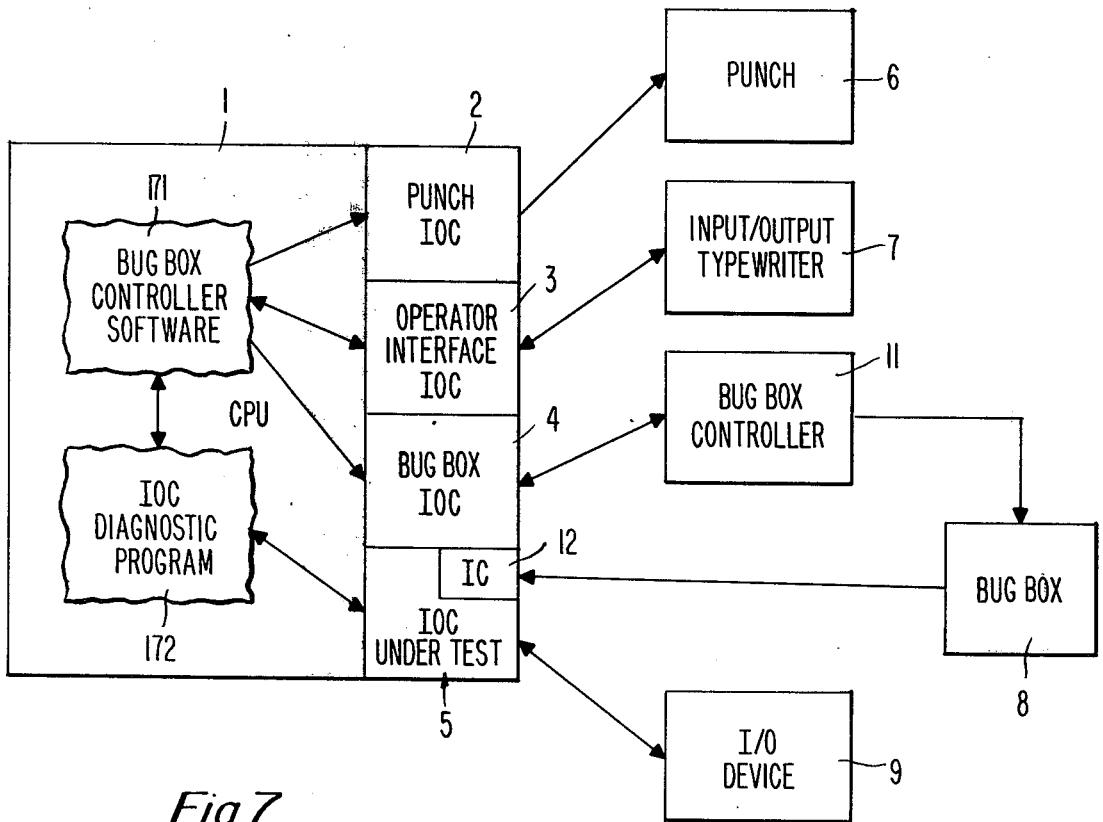
FIG. 7 shows in diagrammatic form the environment for programmatically injecting errors on pins of an integrated circuit which is a logical component of an input/output controller.

The present invention may also be used to obtain failure data on an IOC. As shown in FIG. 7, an integrated circuit 12 is removed from an IOC under test 5 and connected to the Bug Box 8. A standard I/O device 9 is connected to the IOC under test 5.

Under control of the BBCS 171, a bug is injected on one pin of the Integrated Circuit 12 connected to the Bug Box 8, thus creating a logical error in the IOC under test 5. Program control is then transferred to the IOC Diagnostic Program 172, which exercises the logical functions of the I/O device 9 coupled to the IOC under test 5. In exercising the I/O device 9, the logical functions of the IOC under test 5 are also exercised. Upon the detection of an error, the IOC Diagnostic Program 172 will store the data indicating the failure and return control to the BBCS 171. The BBCS 171 will output a description of the error and the error indications on the Card Punch 6 and then proceed to inject a different error in the same manner as used to develop failure data for a DUT 5.

The failure data obtained by this process can be used by the diagnostic programmer to develop a fault dictionary for logic failures occurring in an IOC 5. In addition, the failure data obtained can be used to evaluate the effectiveness of the diagnostic tests in detecting logic failures.

In the preferred embodiment of the present invention, a CPU 1 and IOC 4 supply data and control signals to the Bug Box Controller 11 over an interface between the IOC 4 and the Bug Box Controller 11. However, it should be obvious to one skilled in the art that the present invention is not limited to use with a data processor.

FIG. 8 shows the interface entering and leaving the Bug Box Controller 11. The only required inputs to the Bug Box Controller 11 are data lines MIR1-MIR16, which are used to input 16-bit data and control word patterns, the WRITE signal line which signals the Bug Box Controller 11 that it is to accept data, and the INST signal line which signals the Bug Box Controller 11 whether an operation involving the Data Register 21 or the Control Register 22 is being initiated. EXT 1-EXT 16 data lines are used to read out the contents of the Data Register 21 or Control Register 22 under control of the READ and INST signal lines. Thus the READ and EXT 1-EXT 16 lines need not be utilized to place a bug on an Integrated Circit 12.

Hence, it should be apparent that means other than a data processor can be utilized to supply the necessary data patterns and control signals to the bug Box Controller 11.

In the preferred embodiment of the present invention, the Integrated Circuit 12 whose pin is bugged is a logical element of a DUT 9 coupled to an IOC 5. However, it should be obvious to one skilled in the art that the IC 12 to be bugged need not be logical element the DUT 9, but may be an element of any circuit.

What is claimed is:

1. An apparatus for simulating an in-line error condition at at least one pin of an integrated circuit in accordance with a source of data, command and control information, said control information including an integrated circuit pin specification portion and a voltage level specification portion, said data information specifying pin number identification, said apparatus connected to a source of voltage levels, said integrated circuit logically being an in-line component of an electronic circuit, said integrated circuit being physically removed from the location said integrated circit occupies in said electronic circuit, said apparatus comprising:

data storage means for storing said data information received from said source of data information;

control storage means for storing said control information received from said source of control information;

command means connected to said data storage means, said control storage means and said source of command information and responsive to said command information for storing, respectively, said data information in said data storage means an said control information in said control storage means;

first decoding means connected to said control storage means for decoding said voltage level specification portion of said control information;

second decoding means connected to said control storage means for decoding said integrated circuit pin specification portion of said control information; and switching means connected to said source of voltage levels, said switching means including means for physically receiving said integrated circuit, said switching means further being connected to said electronic circuit location formerly occupied by said integrated circuit, said switching means responsive to said second decoding means, for applying to each of said electronic circuit positions corresponding to an integrated circuit pin specified by said stored data information an error voltage corresponding to the voltage level specified by said first decoding means.

2. The apparatus in accordance with claim 1 wherein said switching means further includes means, responsive to said second decoding means, for propagating signals between pins of said integrated circuit not specified in said stored data information and corresponding points in the position said integrated circuit formerly occupied in said electronic circuit.

3. The apparatus in accordance with claim 2 wherein the decoded integrated circuit pin specification portion of said control information is further characterized as specifying whether the integrated circuit pin specified in the data information is an input to said integrated circuit or an output from said integrated circuit.

4. The apparatus in accordance with claim 3 wherein said switching means is further characterized as including means, responsive to said decoded control information indicating an input to said integrated circuit, for electrically isolating each integrated circuit pin specified in said stored ata information and applying said specified error voltage to each of said isolated integrated circuit pins.

5. The apparatus in accordance with claim 3 wherein said switching means is further characterized as including means, responsive to said decoded control information indicating an output from said integrated circuit, for electrically isolating each integrated circuit pin specified in said stored data information and applying said specified error voltage to each corresponding pin position in the location formerly occupied by said integrated circuit.

6. The apparatus in accordance with claim 1 wherein the decoded integrated circuit pin specification portion of said control information is further characterized as specifying whether the integrated circuit pin specified in the data information is an input to said integrated circuit or an output from said integrated circuit.

7. The apparatus in accordance with claim 6 wherein said switching means is further characterized as including means, responsive to said decoded control information indicating an input to said integrated circuit, for electrically isolating each integrated circuit pin specified in said stored data information and applying said specified error voltage to each of said isolated integrated circuit pins.

8. The apparatus in accordance with claim 6 wherein said switching means is further characterized as including means, responsive to said decoded control information indicating an output from said integrated circuit, for electrically isolating each integrated circuit pin specified in said stored data information and applying said specified error voltage to each corresponding pin position in the location formerly occupied by said integrated circuit.

9. The apparatus according to claim 1 wherein said apparatus further includes means for resetting the contents of said data storage means and said control storage means to all zeros.

10. The apparatus of claim 1 wherein said first decoding means, said second decoding means, said switching means, and said integrated circuit are mounted on an extender circuit board, said extender circuit board being electrically coupled to said electronic circit by an integrated circuit socket.

11. A programmable system for simulating an in-line error condition at at least one pin of an integrated circuit in accordance with a source of data, command and control information, said control information including an integrated circuit pin specification portion and a voltage level specification portion, said data information specifying pin number identification, said system connected to a source of voltage levels, said integrated circuit logically being an in-line component of an electronic circuit, said integrated circuit being physically removed from the location said integrated circuit occupies in said electronic circuit, said programmable system comprising:
 a central processing unit;
 a plurality of input/output control sections;
 a first information carrying bus for communicating said data information, said control information and said command information between said central processing unit and a first of said plurality of input/output control sections;
 data storage means for storing said data information received from the first of said plurality of input/output control sections;
 control storage means for storing control information received from the first of said plurality of input/output control sections;
 command means connected to said data storage means, said control storage means, and the first of said plurality of input/output control sections, and responsive to said command information for storing, respectively, said data information in said data storage means and said control information in said control storage means;
 first decoding means connected to said control storage means for decoding said voltage level specification portion of said control information;
 second decoding means connected to said control storage means for decoding said integrated circuit pin specification portion of said control information; and
 switching means connected to said source of voltage levels, said switching means including means for physically receiving said integrated circuit, said switching means further being connected to said electronic circuit location formerly occupied by said integrated circuit, said switching means responsive to said second decoding means, for applying to each of said electronic circuit positions corresponding to an integrated circuit pin specified by said stored data information an error voltage corresponding to the voltage level specified by said first decoding means.

12. The apparatus in accordance with claim 11 wherein said switching means further includes means, responsive to said second decoding means, for propagating signals between pins of said integrated circuit not specified in said stored data information and corresponding points in the position said integrated circuit formerly occupied in said electronic circuit.

13. The apparatus in accordance with claim 12 wherein the decoded integrated circuit pin specification portion of said control information is further characterized as specifying whether the integrated circuit pin specified in the data information is an input to said integrated circuit or an output from said integrated circuit.

14. The apparatus in accordance with claim 12 wherein said switching means is further characterized as including means, responsive to said decoded control information indicating an input to said integrated circuit, for electrically isolating each integrated circuit pin specified in said stored data information and applying said specified error voltage to each of said isolated integrated circuit pins.

15. The apparatus in accordance with claim 13 wherein said switching means is further characterized as including means, responsive to said decoded control information indicating an output from said integrated circuit, for electrically isolating each integrated circuit pin specified in said stored data information and applying said specified error voltage to each corresponding pin position in the location formerly occupied by said integrated circuit.

16. The apparatus in accordance with claim 11 wherein the decoded integrated circuit pin specification portion of said control information is further characterized as specifying whether the integrated circuit pin specified in the data information is an input to said integrated circuit or an output from said integrated circuit.

17. The apparatus in accordance with claim 16 wherein said switching means is further characterized as including means, responsive to said decoded control information indicating an input to said integrated circuit, for electrically isolating each integrated circuit pin specified in said stored data information and applying said specified error voltage to each of said isolated integrated circuit pins.

18. The apparatus in accordance with claim 16 wherein said switching means is further characterized as including means, responsive to said decoded control information indicating an output from said integrated circuit, for electrically isolating each integrated circuit pin specified in said stored data information and applying said specified error voltage to each corresponding pin position in the location formerly occupied by said integrated circuit.

19. The system according to claim 11, wherein said system further includes means for transferring said data information stored in said data storage means to said central processing unit under program control.

20. The system according to claim 11, wherein said system further includes means for transferring said control information stored in said control storage means to said central processing unit under program control.

21. The system according to claim 11, wherein said system further includes means for programmably controlling optional switching functions, said optional switching functions being specified by a portion of said control information.

22. The system according to claim 11, wherein said electronic circuit is a logical element of one of said plurality of input/output control sections other than said first input/output control section.

23. The system according to claim 11, wherein said electronic circuit is a logical element of an input/output unit attached to one of said plurality of input/output control sections.

24. A method for simulating an in-line error condition at at least one pin of an integrated circuit, said integrated circuit logically being an in-line component of an electronic circuit, said method comprising the steps of:
removing said integrated circuit from the location said integrated circuit occupies in said electronic circuit;
supplying a source of voltage levels;
supplying a source of data, command and control information, said control information including an integrated circuit pin specification portion and a voltage level specification portion, said data information specifying pin number identification;
storing said data information in response to the receipt of a command indicating that said data information is being supplied;
storing said control information in response to the receipt of a command indicating that said control information is being supplied;
decoding said voltage level specification portion of said stored control information;
decoding said integrated circuit pin specification portion of said stored control information; and
applying to each of said electronic circuit positions corresponding to an integrated circuit pin specified by said stored data information an error voltage corresponding to the voltage level specified by said decoded voltage level specification.

25. The method in accordance with claim 24 further including the step of propagating signals between pins of said integrated circuit not specified in said stored data information and corresponding points in the position said integrated circuit formerly occupied in said electronic circuit.

26. The method in accordance with claim 25 wherein the step of applying said error voltage includes the steps of electrically isolating each integrated circuit pin specified in said stored data information and, in response to said decoded integrated circuit pin specification portion of said control information specifying an input pin to the integrated circuit, applying said specified error voltage to each of said isolated integrated circuit pins.

27. The method in accordance with claim 25 wherein the step of applying said error voltage includes the steps of electrically isolating each integrated circuit pin specified in said stored data information and, in response to said decoded integrated circuit specification portion of said control information specifying an output pin from the integrated circuit, applying said specified error voltage to each corresponding pin position in the location formerly occupied by said integrated circuit.

28. The method in accordance with claim 24 wherein the step of applying said error voltage includes the steps of electrically isolating each integrated circuit pin specified in said stored data information and, in response to said decoded integrated circuit pin specification portion of said control information specifying an input pin to the integrated circuit, applying said specified error voltage to each of said isolated integrated circuit pins.

29. The method in accordance with claim 24 wherein the step of applying said error voltage includes the steps of electrically isolating each integrated circuit pin specified in said stored data information and, in response to said decoded integrated circuit specification portion of said control information specifying an output pin from the integrated circuit, applying said specified error voltage to each corresponding pin position in the location formerly occupied by said integrated circuit.

* * * * *

UNITED STATES PATENT AND TRADEMARK OFFICE
CERTIFICATE OF CORRECTION

PATENT NO. : 4,156,132
DATED : 22 May 1979
INVENTOR(S) : Michael John Hazzard

It is certified that error appears in the above-identified patent and that said Letters Patent are hereby corrected as shown below:

```
At column 8, line 23, change "if saved" to --is saved--.
At column 9, line 34, change "Circit" to --Circuit--.
In Claim 1, line 56, change "circit" to --circuit--.
In Claim 1, line 68, change "an" to --and--.
In Claim 4, line 40, change "ata" to --data--.
In Claim 10, line 15, change "circit" to --circuit--.
```

Signed and Sealed this

Twenty-first Day of August 1979

[SEAL]

Attest:

Attesting Officer

LUTRELLE F. PARKER
*Acting Commissioner of Patents and Trademarks*